United States Patent [19]

Todd et al.

[11] 3,731,104
[45] May 1, 1973

[54] BI-ADAPTIVE SCAN DIGITAL UNIVERSAL SENSOR TARGET TRACKER

[75] Inventors: Barry S. Todd, Norco; Werner G. Hueber, China Lake, both of Calif.

[73] Assignee: The United States of America as represented by the Secretary of the Navy

[22] Filed: Jan. 4, 1971

[21] Appl. No.: 103,904

[52] U.S. Cl. .......250/203, 178/DIG. 21, 250/83.3 H, 343/7.4, 343/117 R
[51] Int. Cl. .............................................. G01s 9/64
[58] Field of Search ................... 343/7.4, 16 R, 16 M, 343/117 R; 178/DIG. 21; 250/83.3 H, 203

[56] References Cited

UNITED STATES PATENTS 3,243,804   3/1966   Smith .................................. 343/7.4
3,700,905   10/1972  Parkin et al. ........................ 250/203

Primary Examiner—T. H. Tubbesing
Attorney—R. S. Sciascia, G. J. Rubens, J. W. McLaren and T. M. Phillips

[57] ABSTRACT

Two or more concentric scan boundries are used to track small or large objects. A sensor which has multiple detectors, or a detector with multiple readout signals displaced spatially so as to cover the area of concern with overlapping scans is used for scanning. The central area bounded by the scans is used to sense minor variations in relative object movement. The outer bounded area is used to sense large variations which escape the central area, to sense an object which is initially larger than the central area, and to sense an object which has become larger due to range closure. A digital logic circuit is coupled to the sensor output and generates error signals based on the occurence of object video signals coincident with scan derived timing signals.

1 Claim, 4 Drawing Figures

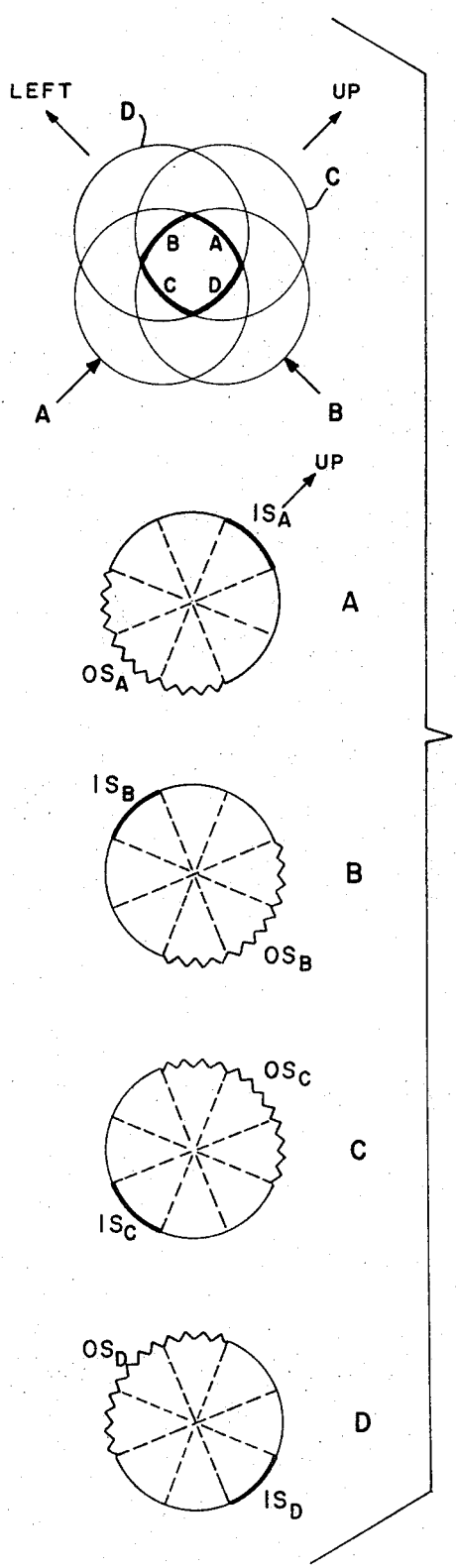
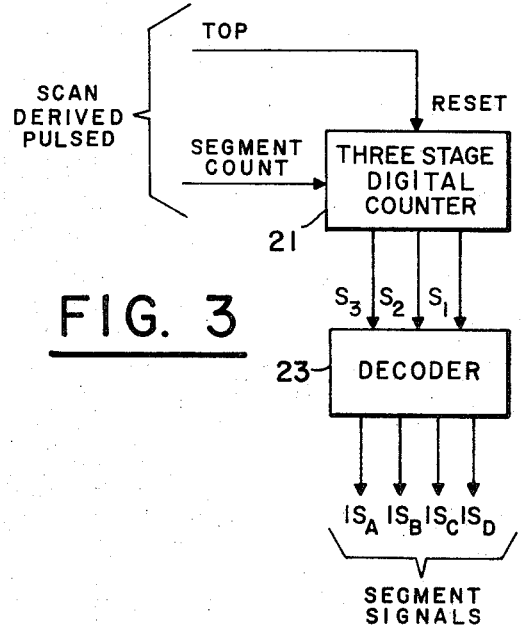
FIG. 3
FIG. 2
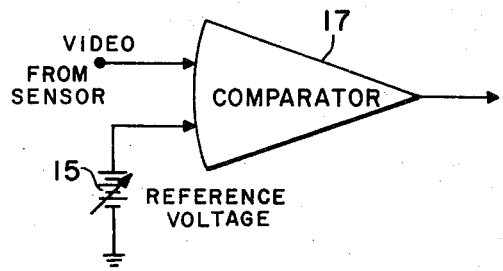
FIG. 4
INVENTORS
BARRY S. TODD
WERNER G. HUEBER
BY
ATTORNEYS

3,731,104

BI-ADAPTIVE SCAN DIGITAL UNIVERSAL SENSOR TARGET TRACKER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Present electro-optical radar and infrared tracking systems which utilize a simple conical shaped scan pattern have a dead area where no information on the exact position of the object to be tracked is available. Unless provision is made for an adaptable scan size which is difficult to achieve, only an optimum object size to scan size ratio will provide acceptable position information. The present invention provides a tracking system which overcomes this limitation while retaining the simple scan pattern, scanning speed and processing simplicity. Two or more concentric scan boundaries are used to track objects of different sizes, small objects which become large due to range closure, and small objects which have escaped the inner boundry. A large area surrounding the object is scanned providing information useful in correlation techniques. A sensor is utilized which has multiple detectors, or a detector with multiple readout signals displaced spatially so as to cover the area of concern with overlapping scans. The central area bounded by the scan is used to sense minor variations in relative object movement. The outer bounded area is used to sense large variations which escaped the central area, to sense an object which is initially larger than the central area, and to sense an object which has become larger due to range closure. A decision of whether a signal corresponding to an object is present at any instant of time is made for each sensor output. Digital logic is then used to generate the proper pair of signals based on the occurrence of object video signals coincident with scan derived timing signals. These error signals or tracking signals are used to maintain the object within the central or outer bounded area.

Accordingly, an object of the invention is to provide an improved target tracking system which is devoid of a dead area for tracking information.

Another object of the invention is to provide an improved target tracking system which generates two or more concentric scan boundries for tracking small or large objects.

Other objects and many of the attendant advantages of this invention will be readily appreciated as the same becomes better understood by reference to the following detailed description when considered in connection with the accompanying drawings wherein:

FIG. 2 is a diagram of scans showing how the inner areas and outer areas are formed;

FIG. 3 is a block diagram showing how the signals are derived from the circular scans of FIG. 2;

FIG. 4 is one form of the video processing circuit of FIG. 1.

Figure 1:
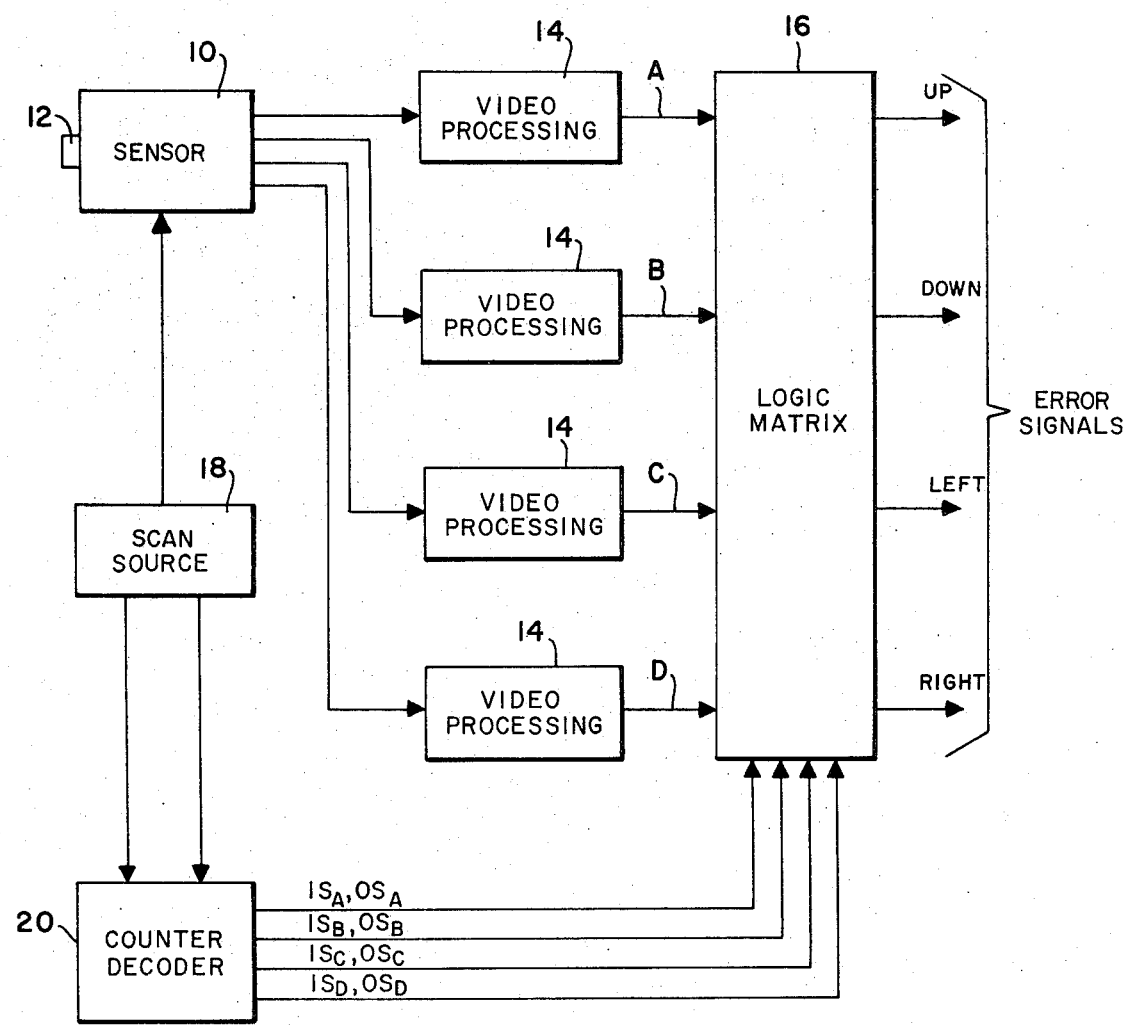
FIG. 1 is a block diagram of the preferred embodiment of the invention.

Referring now to FIG. 1 there is shown in the preferred embodiment in block diagram a sensor 10 which may consist of a number of detectors physically or by electronic means separated spatially with respect to the field of view 12. Sensor 10 may take the form of a multi-aperture image disector, a mechanical scan infrared system with multiple detectors, or four reflector/receiver radar array using a single transmitter with conical scan. Sensor 10 may be constructed to be sensitive in any region of the electromagnetic spectrum. Each of the detector outputs from sensor 10 is connected to a video processing circuit 14. If a target is present in one of the sectors being scanned an output from video processing circuit 14 corresponding to the detector for that particular sector will appear as an output and is fed as a signal input to logic matrix 16. Video processing circuit 14 may be of the type shown in FIG. 4 where the output signal from sensor 10 is compared with a reference voltage 15 by means of comparator 17. Scan source 18 provides the scanning signal to cause sensor 10 to scan in the particular configuration desired. Scan source 18 also provides the segment count signal to counter decoder 20 as well as a reset signal. The output of counter decoder 20 provides scan derived timing input signals to logic matrix 16.

Referring to FIG. 2 there is shown in diagram form a four circular scan. An inner area is generated where all four scans overlap and an outer area where there is no overlap. The inner area scan is shown in heavy line and the outer scan segment is shown with a wavey line. The video signals from each detector are associated with their respective scan, i.e., A, B, C, or D, and with specific scan segments, i.e., in FIG. 3. A video output signal at A, FIG. 1, corresponds to the presence of an object in segment $IS_A$ or $OS_A$ depending on what time during the scan the signal occurred. This is accounted for in the logic derived from selected rules of the tracking system. One possible set of tracking rules is as follows:

| Rule No. | Rule | Table Entry or Entries |
|---|---|---|
| 1. | If all inner segments cross object, no error | 1 |
| 2. | If one inner segment does not cross object, error is away from segment. | 2–5 |
| 3. | If two inner segments do not cross object, errors are away from segments. | 6–9 |
| 4. | If three inner segments do not cross object, error is away from single segment, cannot determine error in direction of paired segments. Wait until object appears in outer segment. | 10–12 |
| 5. | If any inner segment crosses object, ignore outer segment information in that same direction. | 1–13 |
| 6. | If an inner segment pair does not cross object use outer segment information in same direction according to rules 2, 3. | 14–15 |

Table I is compiled based upon the above Rules showing the error signals which need to be generated as a function of the object designation signals. Table I on page 5.

TABLE I

| Table entry number | Video signals present during, segment signals— | | | | | | | | Error signals (zeros are assumed where symbols are missing) | | | |
|---|---|---|---|---|---|---|---|---|---|---|---|---|
| | $IS_C$ | $IS_A$ | $IS_D$ | $IS_B$ | $OS_A$ | $OS_C$ | $OS_B$ | $OS_D$ | Up | Down | Left | Right |
| 1 | 1 | 1 | 1 | 1 | ← any combination → | | | | 0 | 0 | 0 | 0 |
| 2 | 1 | 1 | 1 | 0 | any combination → | | | | | | | 1 |
| 3 | 1 | 1 | 0 | 1 | | | | | | | 1 | |
| 4 | 1 | 0 | 1 | 1 | ← any combination | | | | | 1 | | |
| 5 | 0 | 1 | 1 | 1 | | | | | 1 | | | |
| 6 | 1 | 0 | 0 | 1 | any combination → | | | | | 1 | 1 | |
| 7 | 0 | 1 | 1 | 0 | | | | | 1 | | | 1 |
| 8 | 1 | 0 | 1 | 0 | | | | | | 1 | 1 | 1 |
| 9 | 0 | 1 | 0 | 1 | | | | | 1 | | 1 | |
| 10 | 1 | 0 | 0 | 0 | any combination | | | | | 1 | | |
| 11 | 0 | 1 | 0 | 0 | | | | | 1 | | | |
| 12 | 0 | 0 | 1 | 0 | | | | | | | | 1 |
| 13 | 0 | 0 | 0 | 1 | | | | | | | 1 | |
| 14 | { 1 0 1 | 1 1 0 | 0 0 0 | 0 0 0 } any comb. | | | { 1 0 1 | 0 1 1 } | 1 | | 1 1 | 1 |
| 15 | { 0 0 0 | 0 0 0 | 1 0 1 | 1 1 0 } | { 1 0 1 | 0 1 1 any comb. | | | 1 | | 1 1 | 1 |

FIG. 3 shows a three stage digital counter 21 (which may be a three stage flip-flop circuit) which divides the circles into eight segments. The output from counter 21 is fed into a decoder 23 which will provide outputs to satisfy the following equations.

Inner Area
$IS_A = S_1' S_2' S_3$
$IS_B = S_1 S_2 S_3$
$IS_C = S_1 S_2' S_3$
$IS_D = S_1' S_2 S_3$ Outer Area
$OS_A = S_1 S_3' + S_1 S_2'$
$OS_B = S_1' S_2 + S_1 S_2' S_3'$
$OS_C = S_1' S_2' + S_1' S_3'$
$OS_D = S_1 S_2 + S_1' S_2' S_3'$ Where letter with prime = 0; letter without prime = 1.

The implementation of the logic matrix 16 shown at FIG. 1 can be derived using traditional combinatorial system design which is well known in the art, i.e., Caldwell, Samuel H., Switching Circuits and Logic Design, Wiley, N.Y., 1958, 119 through 143. The result is a combinatorial network which provides the proper error signals responding to any set of inputs.

Obviously many modifications and variations of the present invention are possible in the light of the above teachings. It is therefore to be understood that within the scope of the appended claims the invention may be practiced otherwise than as specifically described.

What is claimed is:

1. In a passive electro-optical bi-adaptive scan target tracker having two concentric scan boundries for tracking targets of different sizes, small objects which become large due to range closure, and small objects which have escaped the inner boundry, the combination comprising:

an electro optical sensing means having four circularly scanning detectors capable of scanning an area of concern with over-lapping boundries, scan control means coupled to said sensing means for controlling the pattern of scan to generate an inner tracking area only where all scans overlap and an outer area comprised of the non-overlapping areas, logic matrix means having first and second inputs and having multiple outputs, video processing circuit means coupled to said electro-optical sensing means and to said first inputs of said logic matrix for generating an output video signal whenever an object appears in the scan area pertaining to that particular video processing circuit, a counter decoder coupled to said scan control means and to said second inputs of said logic matrix for generating scan derived timing signals, said logic matrix being responsive to said input video signals and said scan derived timing signals for generating an output error signal according to the location of the target within the area being scanned by said sensing means.

* * * * *